Jan. 28, 1958  F. S. DAVILA  2,821,306
PRE-CLARIFIER FOR SEPARATING SOLIDS AND LIQUIDS
Filed Feb. 7, 1955  4 Sheets-Sheet 1
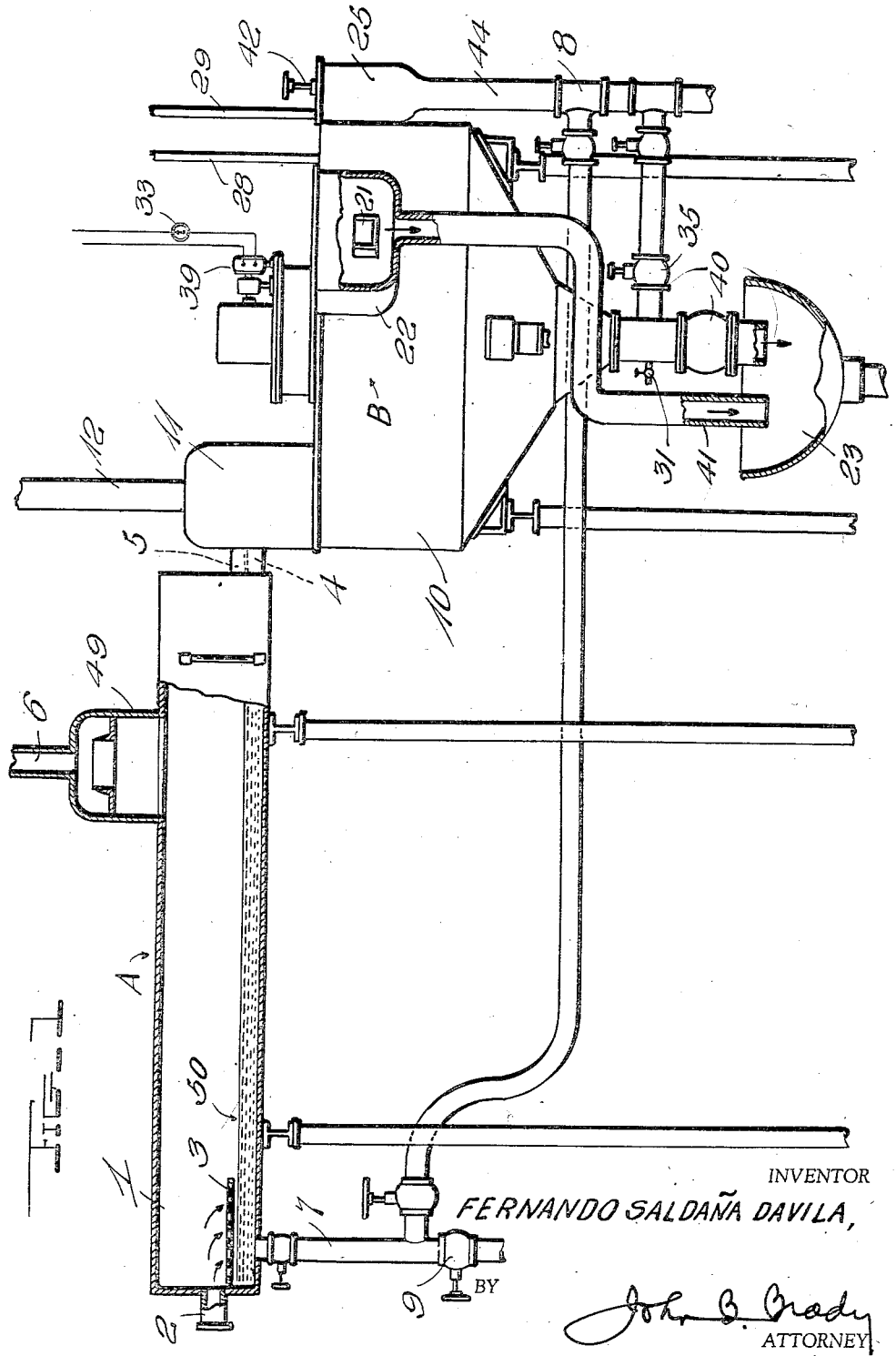
INVENTOR
FERNANDO SALDAÑA DAVILA,
BY
ATTORNEY

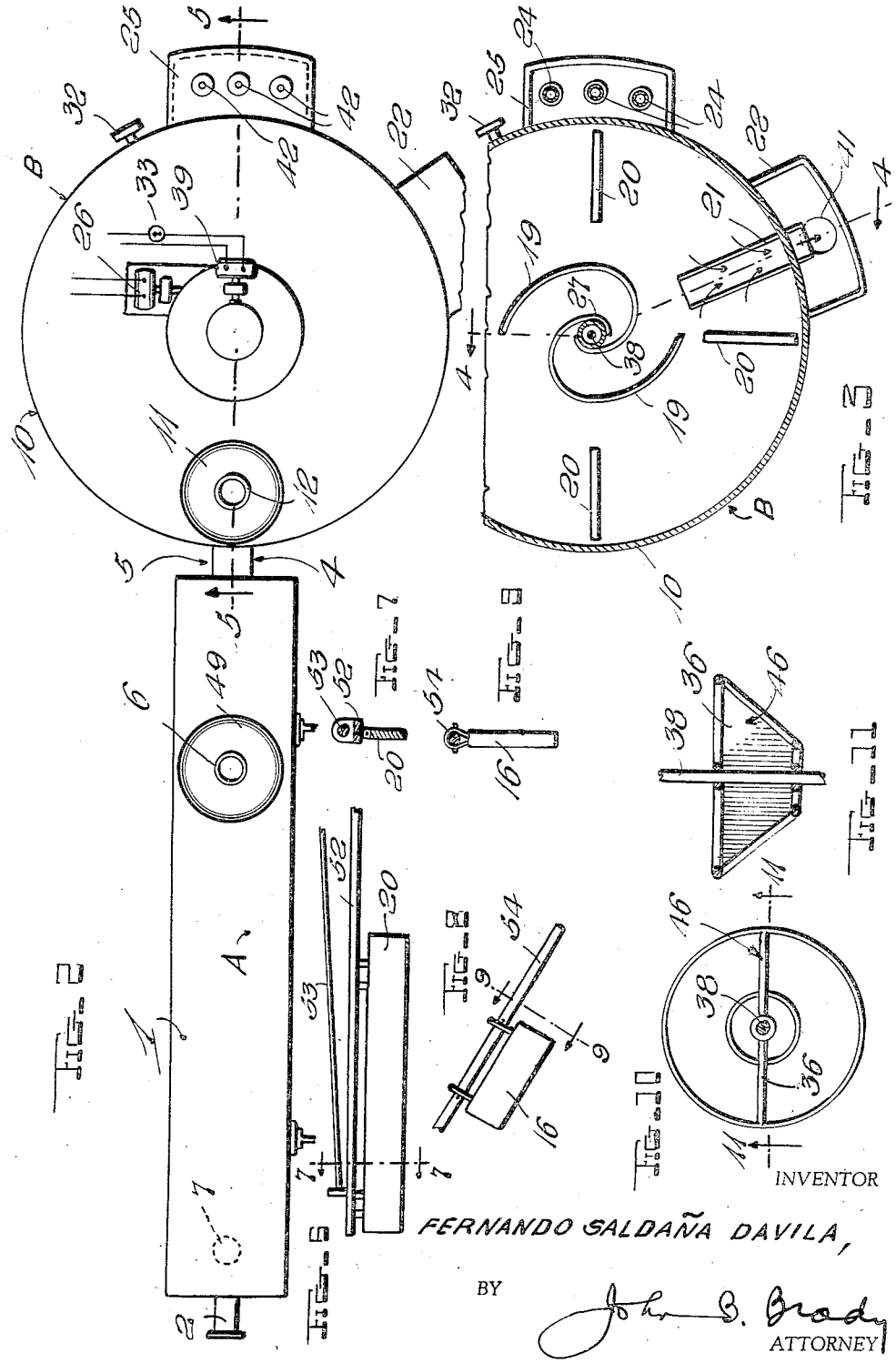

Jan. 28, 1958 F. S. DAVILA 2,821,306
PRE-CLARIFIER FOR SEPARATING SOLIDS AND LIQUIDS
Filed Feb. 7, 1955 4 Sheets-Sheet 3
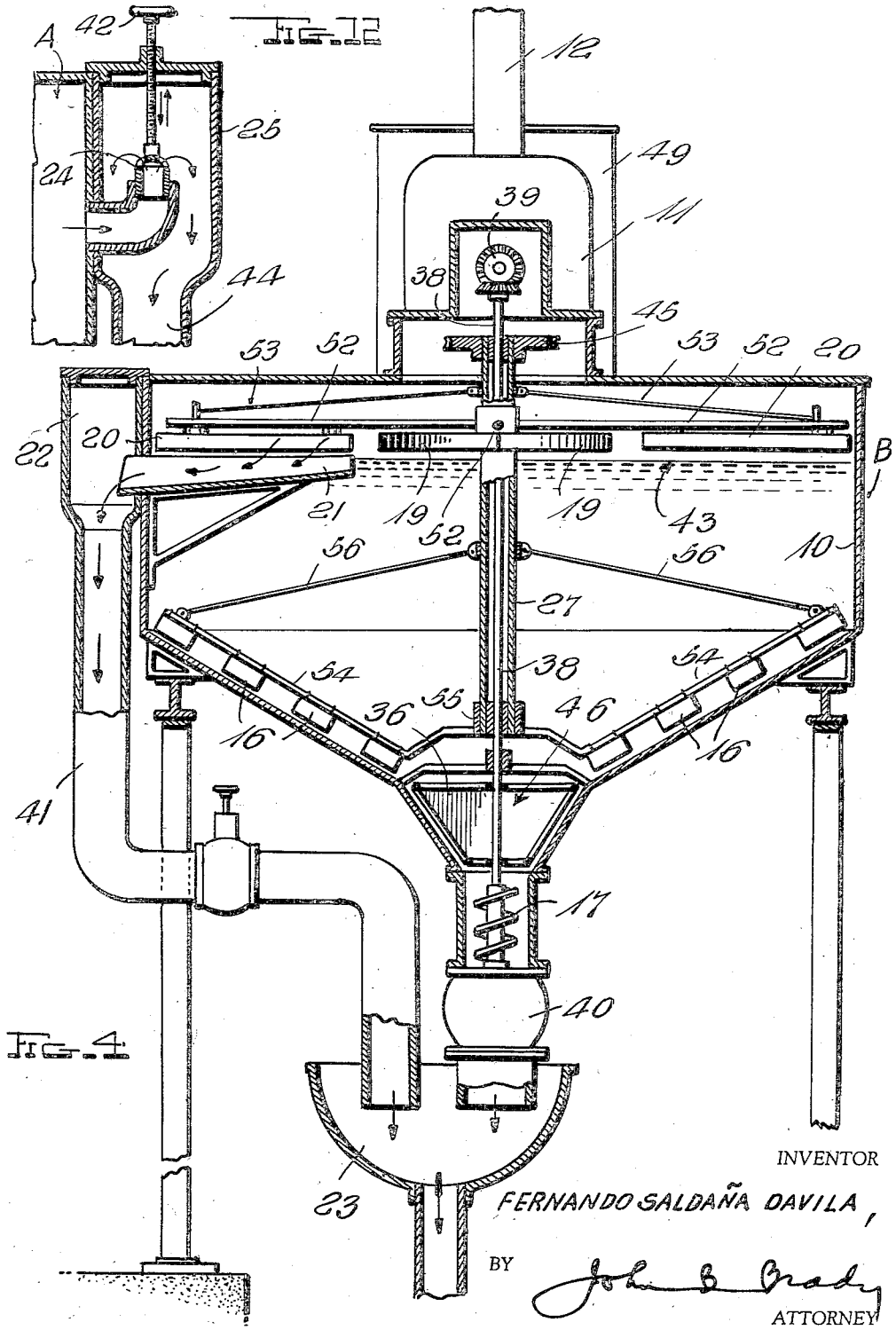
INVENTOR
FERNANDO SALDAÑA DAVILA,
BY
ATTORNEY

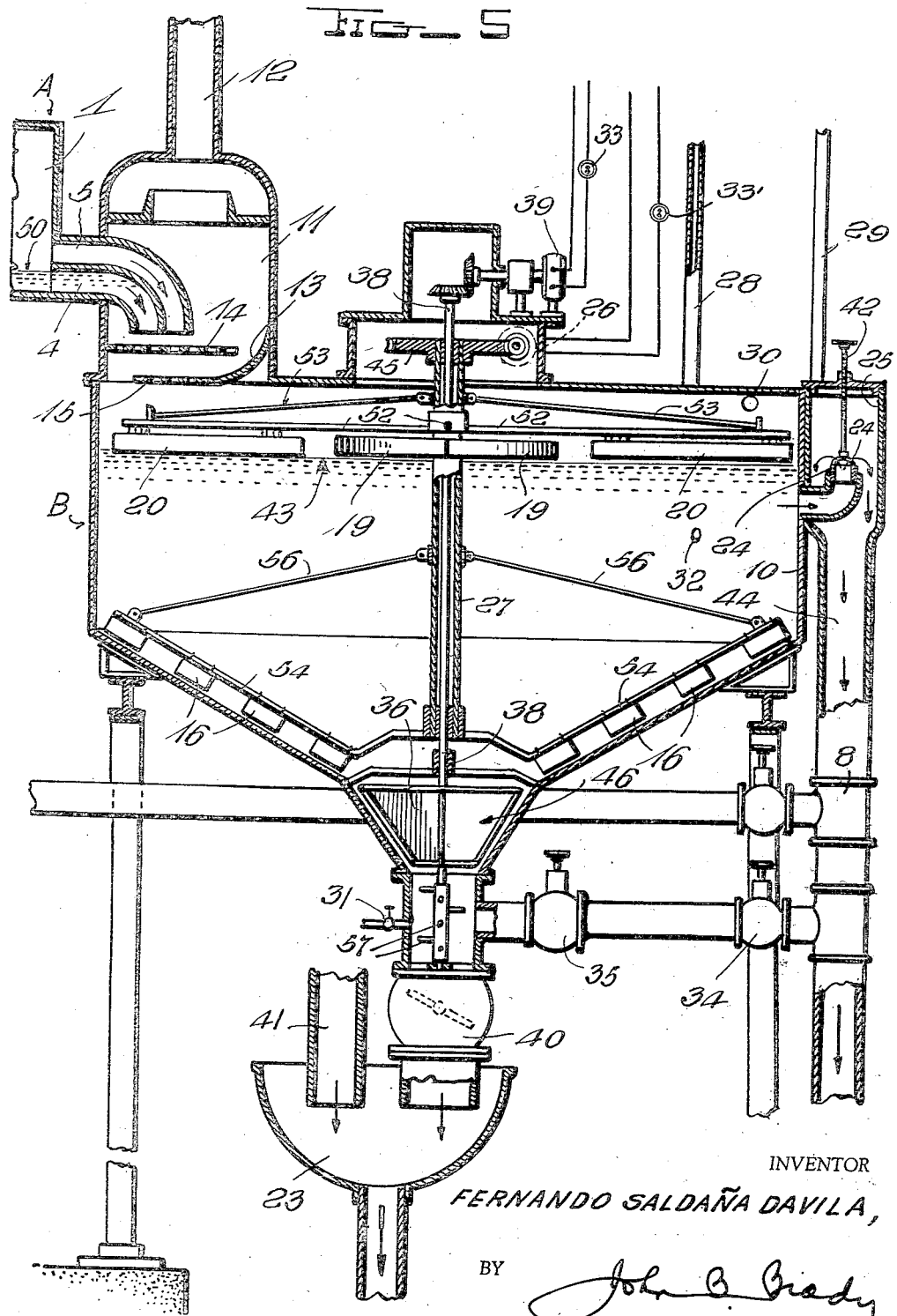

United States Patent Office 2,821,306
Patented Jan. 28, 1958

2,821,306

PRE-CLARIFIER FOR SEPARATING SOLIDS AND LIQUIDS

Fernando Saldana Davila, Bayamon, Puerto Rico

Application February 7, 1955, Serial No. 486,630

3 Claims. (Cl. 210—525)

This invention is directed to a novel machinery unit which I have named a "pre-clarifier" for application in processes involving the separation of a solid from a liquid by sedimentation, such processes to be either directly applied to a mixture of said solid and liquid, or after treatment with agents to produce coagulation as is the case, for example, with ores, sewage, sugar liquors, etc.

The machine of my invention serves to partially purify, and prepare for a secondary or final purification in conventional settlers, in continuous manner, sugar liquors and other liquids actually purified through a single clarification stage, thus changing such purification to a two-stage process, the first stage consisting of the pre-clarifier of my invention.

The pre-clarifier separates the gases present in the liqours undergoing purification, such as air and water vapor, light floating particles, such as foam and scums, heavy materials, such as earth, coarse minerals, sand and mud. The pre-clarifier also serves as a flocculating chamber previous to the secondary clarification of such liquors, with or without the addition of one or more coagulants, and with or without the application of heat.

One of the objects of my invention is to provide an apparatus for separating solids and partial solids from fluids including means for progressively settling the solids out of the fluids progressively with the fluid flow and then subjecting the partially clarified fluid to a clearing action by skimming floating particles from the surface of the fluid and gravitating heavier particles through the body of the fluid.

Another object of my invention is to provide a construction of pre-clarifier including a rotary means for skimming the surface of liquid in a settling tank by helicoidal bands and scrapers for removing floating particles from the liquid while gravitating heavy particles through the body of the liquid for discharge therebeneath.

Still another object of my invention is to provide a construction of rotary drive mechanism for a liquid settling tank wherein said mechanism includes a pair of operating shafts centrally arranged one within the other, wherein one of the shafts operates to drive means for removing floating particles from the surface of the liquid and to direct heavier particles into a discharge system below the liquid, while the other of said shafts drives means for continuously clearing the discharge path for the heavier particles for insuring continuous operation of the separating mechanism.

Still another object of my invention is to provide a construction of settling tank for liquid having means for regulating or adjusting the overflow or discharge liquor level for removing by floatation the maximum quantity of floating particles from the surface of the fluid in the floatation process.

Other and further objects of my invention reside in the construction of pre-clarifier and separator described more fully in the specification hereinafter following by reference to the accompanying drawings, in which:

Fig. 1 is a side elevational view showing the assembly of the settling tank and pre-clarifier of my invention, certain of the parts being broken away and shown in section for more clearly explaining the invention;

Fig. 2 is a top plan view of the settling tank and pre-clarifier installation of my invention;

Fig. 3 is a schematic partial plan view showing the arrangement of the helicoidal bands and scraping blades employed in the rotary mechanism of the pre-clarifier of my invention;

Fig. 4 is a vertical sectional view taken on line 4—4 of Fig. 3, and illustrating particularly the scum channel for discharging the relatively light floating particles from the surface of the tank of the pre-clarifier;

Fig. 5 is a vertical sectional view taken on line 5—5 of Fig. 2;

Fig. 6 is a fragmentary view of one of the scrapers employed in the rotary mechanism at the top of the pre-clarifier tank;

Fig. 7 is a vertical sectional view on line 7—7 of Fig. 6;

Fig. 8 is an elevational view showing one of the scrapers operative with respect to the frusto-conical body of the tank of the pre-clarifier for advancing heavier particles to the central discharge in the pre-clarifier tank;

Fig. 9 is a transverse sectional view on line 9—9 of Fig. 8;

Fig. 10 is a plan view of the stirring mechanism employed at the bottom of the tank of the pre-clarifier;

Fig. 11 is a side elevational view of the stirring element shown in Fig. 10; and Fig. 12 is an enlarged sectional view showing the mechanism for regulating the discharge level of out flowing liquid in the tank of the pre-clarifier.

The machine of my invention consists of the following principal parts: A liquor receiving and distributing chamber A, which also serves as an auxiliary separator, and a main separating tank B. The auxiliary separator effects a concentration of the said matter present in the liquor undergoing purification, and it will also permit the separation of a portion of partially purified liquor; by so doing it will result in an increase of capacity and efficiency of operation of the main tank B.

The pre-clarifier includes chamber A and main separating tank B, where chamber A consists of a horizontal cylinder 1, a liquor inlet pipe 2, a baffle separator 3, and two pipes 4 and 5 connecting the cylinder A to the main tank B. The cylinder 1 also includes a vent pipe 6 and a liquor draw-off pipe 7. By the arrangement shown the heavy impurities, such as earth and sand, will be thrown towards the outlet end of the cylinder by the force of the current of the incoming liquor and flow into the main tank B through pipes 4 and 5. The light floating impurities, such as particles of vegetable tissue and scums, will be delivered into main tank B through the top part of pipe 4, or through pipe 5. A portion of partially purified liquor, similar to that coming out from the main machine, will be discharged through pipe 7. This portion of partially purified liquor will either go direct for secondary clarification, or further disposal, through valve 9, or will join the portion of liquor coming out from the main tank B at position 8.

The approximate working level of liquor in the cylindrical tank 1 has been indicated at 50 in Figs. 1 and 5, the working level being set by outlets 4, 5 and 7, according to the quantity of liquor passing through inlet 2.

The sedimentation or main chamber B consists of a cylindrical body 10 with a frusto-conical bottom and is provided with an entrainment separator 11 and vent pipe 12 for use in such cases when only part B of the machine is in use. A series of baffle and perforated plates 13, 14, and 15, shown in Fig. 5, serve to reduce turbulence and splashing of the incoming liquor as it enters the cylindrical body 10. Such sedimentation chamber B, fitted with scrapers 16 at the bottom, will eliminate heavy settled matter through screw 17 and finally through check valve 40. The bottom scrapers 16 are supported on radial arms or spokes 54 suspended at their upper ends from shaft 27 by links 56 and connected at their lower ends at 55 with the shaft 27 as shown. The bottom scrapers 16 are mounted in staggered relationship on the respective arms or spokes 54. There are two radial pairs of arms 54 corresponding in number to the number of radial spokes 52 which support the scum paddles 20.

On the top part of the main tank 10 there is located the scum removing system which consists of a rotary frame including the radial spokes 52 supporting helicoidal bands 19 and scrapers 20 operating in the scum belt over an open inclined channel or chute 21, which discharges the floating impurities with the aid of a pressure directed water spray, when required, into the box 22 and from there to a common sediment and scum discharge trough 23 through pipe 41. The rotary frame 52 is supported at the inner ends of the spokes on shaft 27 and is driven from rotary shaft 27 through suspension links 53.

The pre-clarified liquor passes into the liquor receiving tank 25 which encloses a number of adjustable outlets 24 controlled by adjustable level rods 42 through which the liquor from the main tank 10, below the top scum layer, represented at 43, will flow by gravity into the collecting pipe 44 and from there into the second clarification units, or to the discharge pipe at position 8.

The level of the liquor in the main tank 10 in connection with the scum removing device will be set by means of the adjustable level outlets 24, the latter being operated by the screw-threaded stems and hand wheels designated at 42 from an outside platform.

The driving mechanism consists of a motor and speed reducer 26 and such necessary appliances as to impart the required speed to the hollow tubular shaft 27 through gear 45.

The machine is provided with the necessary vents 28 and 29, an overflow pipe 30, steam out connections 31 to the mud outlet valve containing screw 17 and thermometer 32. Two discharge control valves 34 and 35 are arranged in the discharge pipes connected with the bottom of the tank 10. Located at the bottom of pipe 10 there is a mud concentrator 46, the moving blades of which, 36, are attached to inner shaft 38, that extends within hollow shaft 27. This mud concentrator, illustrated more clearly in Figs. 4, 5, 10 and 11, keeps the sediment in slush form in which condition it will be eliminated at the bottom through screw 17 and check valve 40. The bottom mud removal device 46, shown in detail in Figs. 10 and 11, is automatically operated through the same shaft 38 that drives screw 17. The mud screw 17 is fastened to inner shaft 38 as are the moving parts of mud concentrator 46, such inner shaft passing through the interior of the main hollow shaft 27. A motor and speed reducer 39 drives the screw shaft 38 as well as the moving parts of the mud concentrator 46. The check valve 40, placed immediately after the screw 17, is initially set to allow a minimum of outflow during operation. The valve 40 is opened to allow discharge of sediment and is closed during operation of the concentrator. Valve opening and sediment discharge is regulated and carried out between pre-established limits for satisfactory operation. The load on the motor and speed reducer 39, which is proportional and indicative of the quantity of sediment accumulated in the bottom of tank 10, is shown by an ammeter 33 connected through a current transformer to the motor circuit. Similarly an ammeter 33' is connected in the circuit to motor 26 for indicating the load on the speed reducer and motor system 26. Steam out connections 31 serve to clean out accumulations that might otherwise obstruct the operation of the mud removal device 46, should these occur.

Whenever necessary, the machine is covered on the outside with suitable heat insulating material in order to reduce excessive radiation losses.

The capacity of the pre-clarifier varies according to conditions of operation, between approximately five and fifteen percent of the total clarification equipment required.

The two rotary systems employed in the pre-clarifier operate in co-acting relation to each other at speeds which may be selected to meet required conditions where driving motor and speed reduction system 26 is suitably adjusted as to speed for rotatably driving through hollow shaft 27, both the scrapers 20 and helicoidal bands 19 for removing the floating particles to the scum channel or chute 21. At the same time hollow shaft 27 rotatably drives the scraper 16 for advancing the heavier particles through the mud concentrator 46. Shaft 38 independently driven through speed reduction system and motor 39 is also adjustable in speed by controlling the speed of motor 39 for correspondingly controlling the speed at which mud concentrator 46 is driven and simultaneously controlling the speed of rotation of screw 17. Thus heavy solid matter is continuously discharged through the machine for insuring a reliable separation operation.

According to the conditions of the liquid and solid mixture to be treated, and to the nature of the sediment, the screw 17 may be substituted for a series of staggered lugs 57, shown in Fig. 5, or a combination of both screw and lugs.

The scum box 22, with its adjuncts, scum blades, helicoidal bands, scum chute and scum delivery pipe comprise a basic part of the machine different and separate from the liquor box 25 with its related parts, liquor delivery pipe, liquor level adjusting outlets, etc.

While I have described my invention in certain of its preferred forms, I realize that modifications may be made and I desire that it be understood that no limitations upon my invention are intended other than may be imposed by the scope of the appended claims.

What I claim as new and desire to secure by Letters Patent of the United States is as follows:

1. Apparatus for separating solids from liquids progressively with the continuous flow of liquids comprising a frusto-conical tank, means for delivering a mixture of solids and liquids through the top of said tank to a predetermined level, means for eliminating the gases evolved from said mixture, a central discharge pipe connected with the bottom of the tank, an overflow discharge receptacle connected with one side of the periphery of said tank at the predetermined level of the liquid in said tank, a discharge pipe connected with said receptacle for delivering the partially clarified liquid, a scum chute located adjacent the predetermined level of the liquid in said tank for conducting away the lighter particles floating on the surface of the liquid in said tank, means for moving the lighter particles in said tank outwardly into said chute and into the receptacle for receiving the lighter floating particles connected with said tank, a discharge pipe connected with said receptacle for receiving the lighter floating particles while the heavier particles are delivered to the discharge pipe connected with the bottom of said tank, in which said means for moving the lighter particles floating on the surface of the liquid in said tank into said chute and into said receptacle comprise a plurality of rotatably driven radially disposed blades each of which sweeps the top surface of the liquid in said tank, helicoidal blades coacting with the aforesaid blades for directing the lighter particles into said chute and into said receptacle and in which the means for moving the lighter particles floating on the surface of the liquid and the heavy sediment deposited on the bottom in said tank include an inner shaft and an outer hollow shaft, means for rotatively driving said shafts, and wherein said outer shaft has spokes thereon for mounting said radially disposed blades and wherein said outer shaft also carries said helicoidal blades and wherein said inner shaft extends through the aforesaid hollow shaft and operates to drive an agitating means aligned with the central discharge pipe which connects with the bottom of the tank.

2. Apparatus for separating solids from liquids progressively with the continuous flow of liquids comprising a frusto-conical tank, a central discharge pipe connected with the bottom of said tank, means for delivering a mixture of solids and liquids through the top of the tank to a predetermined level, a vertically disposed inner shaft connected with rotative agitation means located in said central discharge pipe, a hollow outer shaft concentrically surrounding said inner shaft, means for rotatably driving said shafts, a pair of helicoidal blades carried by said outer shaft and revolvable over the surface of the liquid in said tank, suspension links connected with said outer shaft and extending radially therefrom, a frame connected with said outer shaft and supported by said suspension links, radially disposed blades connected with said frame and extending through distances spaced from the extremities of said helicoidal blades to limits adjacent the inner walls of said tank, said blades all extending in substantially the same horizontal plane and coacting with said helicoidal blades for sweeping the surface of the liquid in said tank and discharge means aligned substantially horizontally with the level of the fluid in said tank for receiving and discharging the scum swept from the surface of the liquid by both said helicoidal blades and said radially disposed blades progressively as said shafts are rotatably driven.

3. Apparatus for separating solids from liquids progressively with the continuous flow of liquids as set forth in claim 2 in which said helicoidal blades have their outer extremities terminating in spaced radial alignment with the inner extremities of diametrically positioned radially disposed blades.

References Cited in the file of this patent

UNITED STATES PATENTS

| | | |
|---|---|---|
| 1,053,172 | Hendryx | Feb. 18, 1913 |
| 1,662,702 | Hebden | Mar. 13, 1928 |
| 1,830,516 | Kurie et al. | Nov. 3, 1931 |
| 2,593,036 | Koch | Apr. 15, 1952 |